United States Patent

Jacob et al.

[11] Patent Number: 6,038,374
[45] Date of Patent: *Mar. 14, 2000

[54] SYSTEM AND METHOD FOR CONSTRUCTING CALIBRATED COLOR TABLES IN COLOR IMAGE REPRODUCTION SYSTEMS USING STOCHASTIC SUPERSAMPLING

[75] Inventors: Steve A. Jacob, Boise; Victor D. Loewen; Kurt R. Bengtson, both of Eagle; David A. Johnson, Boise, all of Id.

[73] Assignee: Hewlett-Packard Company, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/869,052

[22] Filed: Jun. 4, 1997

[51] Int. Cl.$^7$ .............................. B41B 15/00; G06K 9/00; G03F 0/08
[52] U.S. Cl. ........................... 395/109; 382/167; 358/518
[58] Field of Search ............................ 395/109; 382/167; 358/518–523, 504, 534, 535

[56] References Cited

U.S. PATENT DOCUMENTS

| 5,416,613 | 5/1995 | Rolleston et al. | 358/518 |
| 5,594,557 | 1/1997 | Rolleston et al. | 358/158 |
| 5,761,327 | 6/1998 | Papritz | 382/167 |

*Primary Examiner*—Thomas D. Lee
*Assistant Examiner*—Wenpeng Chen

[57] ABSTRACT

A color table calibration system produces multiple color samples for each target color point in a color table. Each sample is offset from the target color within the color space by a random amount that is equal to a fixed offset plus a random interval. In the preferred implementation, the fixed offset is equal to a distance approximately equal to the color excursion caused by noise and the random interval is constrained to not exceed the fixed offset. The color table calibration system prints a set of multiple samples for each color point. The color samples are measured using conventional measuring devices and then averaged. The color table calibration system uses the sample average to derive a calibrated color table. The pseudo random supersampling and averaging for each color point reduces errors introduced by mechanical and environmental variations.

13 Claims, 4 Drawing Sheets

SYSTEM AND METHOD FOR CONSTRUCTING CALIBRATED COLOR TABLES IN COLOR IMAGE REPRODUCTION SYSTEMS USING STOCHASTIC SUPERSAMPLING

FIELD OF THE INVENTION

This invention relates to image reproduction systems. More particularly, this invention relates the systems and methods for constructing color tables used in color image reproduction systems, such as printers, photocopiers, scanners, and the like.

BACKGROUND OF THE INVENTION

Conventional image reproduction systems typically utilize a color table to produce color images. The color table has entries that specify relative quantities of three primary colors (e.g., red-blue-green (RBG) or cyan-yellow-magenta (CYM)), which produce different blends of the three colors resulting in various color shades. The color table can be conceptualized as a three-dimensional color space defined by the three primary colors. The table entries define equal spaced color points in this space along the three color axes. As an example, a color table might have 17 color points along each of the three color axes. Movement along each axis results in a different color output.

When producing a color image, the image reproduction system receives a color value (e.g., an RBG value, or a CYM value) for each data element in the image. The color value consists of three 8-bit values that identify one color point on each color axis. The image reproduction system uses the color value to lookup in the color table and retrieve the appropriate color blending quantities to form the desired color. The parameters retrieved from the color table are passed to the imaging subsystem to produce a colored dot. As an example, the color table output comprises four 8-bit values, one for each of the three colors and a fourth value for black.

In most cases, the quality of the color image is acceptable. However, in some applications, it is desirable to improve the quality of the color image. For instance, graphic arts applications and digital photography applications benefit from the highest quality color reproduction.

To improve the color quality and color matching, image reproduction systems are calibrated to produce colors with the intended hue, lightness, and colorfulness. This calibration process involves a sample-and-measure technique. The image reproduction system produces color samples from regularly spaced color points in the color space. A color printer, for example, prints color samples in the form of square patches on several sheets of paper. The printer deposits one patch of one color point, then varies one or more of the three primary colors to arrive at a next color point and prints the next patch for that next color point. The process is repeated until a full sample array of square patches is produced.

A measuring device is utilized to measure the color quality of the color samples. Conventional measuring devices include a densitometer, which measures the density of the color within the color patch; a calorimeter, which measures the spectral response of the color patch; and a spectrophotometer, which provides a more accurate measurement of the spectral response. These measurement devices are typically constructed as handheld units, although they can be implemented into machines with media handling capabilities.

The measuring process generally consists of a technician holding the measurement device over each color sample to obtain an actual color reading for that sample. The measurement device averages multiple readings of the same color sample to derive a measured color content. The data from the measurement is used to calibrate the color table. This is done for each color sample.

Thereafter, when producing a colored image, the image reproduction system processes the incoming color value by looking up in the color table to find the indexed color points of the color space. The image reproduction system then interpolates between the color points to adjust the blended color quantities. This results in a more accurate and truer color output.

One of the drawbacks of this conventional approach to calibrating a color table is that it assumes consistent and identical reproduction conditions when printing color samples. This is, unfortunately, not the case. Mechanical and environmental induced variations tend to introduce unpredictable and sometimes significant errors into the color table. There are many sources for these variations. Machines are inherently imperfect and tend to change as they age; they operate in environments where temperature and humidity fluctuate; and they handle paper or media that might vary in quality from sheet-to-sheet. Due to these externally introduced errors, producing the same color sample ten times might very well result in ten different measurements. If a measurement is used that has deviated from the average response of the machine, interpolations using the resulting color table will consistently produce erroneous results.

Accordingly, it would be beneficial to develop a color calibration technique that accounts for errors introduced by mechanical and environmental variations.

SUMMARY OF THE INVENTION

This invention concerns a color table calibration system for calibrating a color table used in a color image reproduction system, such as a printer, photocopier, scanner, and the like. The color table calibration system employs pseudo random super sampling and averaging to reduce errors introduced by mechanical and environmental variations.

According to one aspect of this invention, the color table calibration system produces multiple color samples for each target color point in the color table. Each sample varies the target color by a random amount. More particularly, the color table calibration system generates a sample that is offset from the target color within the color space by a random amount that is equal to a fixed offset plus a random interval. In the preferred implementation, the fixed offset is equal to a distance that is less than the distance between two adjacent color points in the color space and approximately equal to a color excursion distance introduced by noise. The random interval is constrained to not exceed the fixed offset.

The color table calibration system prints a set of multiple samples for each color point. According to another aspect of this invention, the calibration program causes the samples within a set to be printed on different areas of one page, and more preferably, on different pages. Printing the samples on different page areas of different pages introduces an element of randomness that helps remove any adverse affect that might be caused by inconsistent media quality from one page to the next.

The color samples are measured using conventional measuring devices and then averaged. The color table calibration system uses the sample average to construct a calibrated color table. The color table calibration system can be implemented in a computer external to the image reproduction system or internally of the image reproduction system.

BRIEF DESCRIPTION OF THE DRAWINGS

FIG. 3 illustrates a preferred super sampling range of the calibration system.

DETAILED DESCRIPTION OF THE PREFERRED EMBODIMENT

Figure 1:
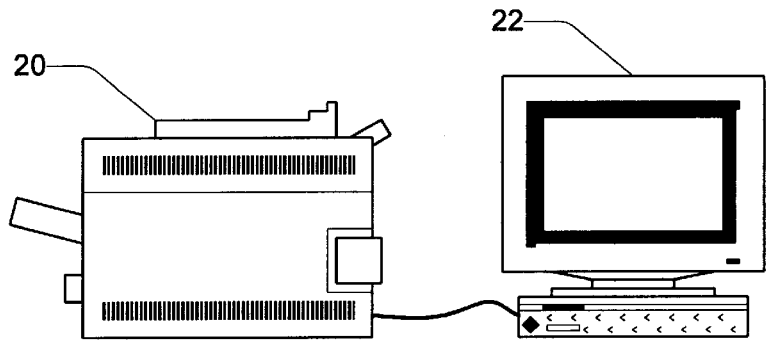
FIG. 1 is a side view of a printer and workstation.

This invention relates to color image reproduction systems. Aspects of this invention are primarily directed to printers. FIG. 1 shows a color laser printer 20 connected to a workstation 22. This invention may also be implemented for other types of printers, such as inkjet printers and color thermal printers. Although the invention is described in the context of printers, it may be used in conjunction with other color image reproduction systems, such as color photocopiers, color scanners, and the like.

Figure 2:
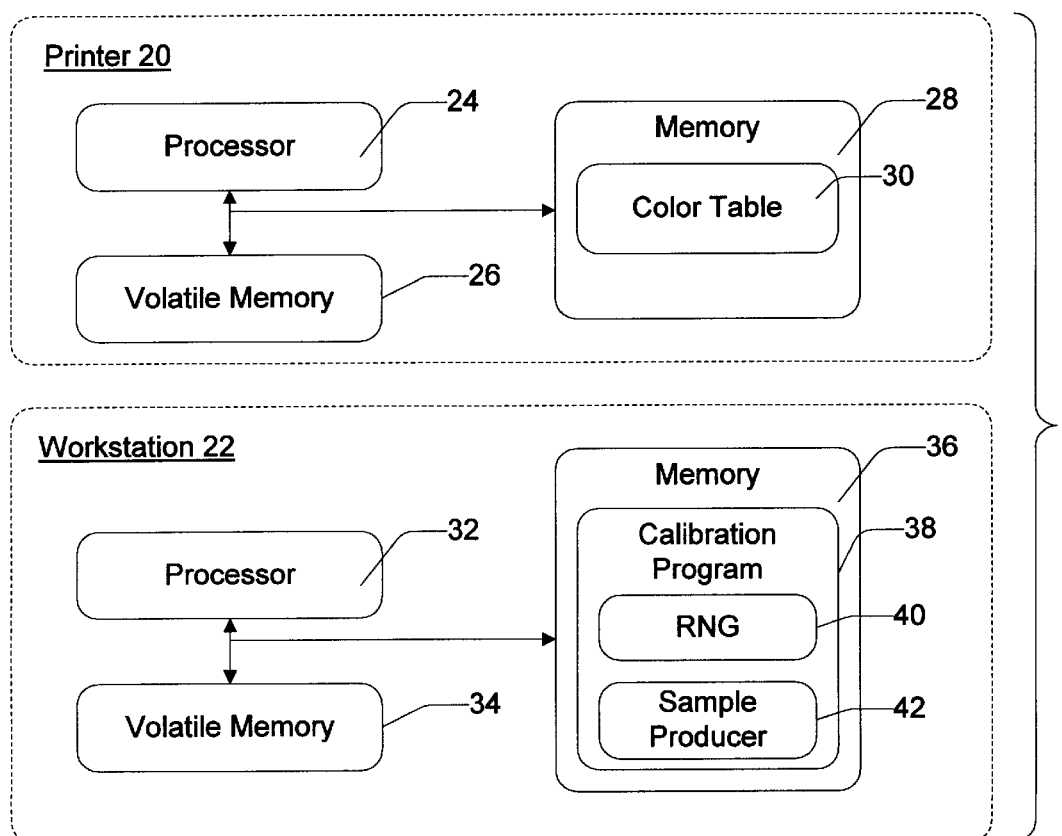
FIG. 2 is a block diagram of a color table calibration system implemented in the workstation for calibrating a color table in the printer.

FIG. 2 shows a color table calibration system implemented in a processing unit of the computer workstation 22 to create a color table maintained in the printer 20. In other embodiments, the color table calibration system may be implemented in the color printer 20, rather than in the workstation 22.

The color printer 20 has a processor 24, a volatile memory 26 (i.e., RAM), and a non-volatile memory 28 (e.g., ROM, Flash). A color table 30 is stored in the non-volatile memory 28. The color table 30 holds colorant quantities for three primary colors, such as red-blue-green (RBG) or cyan-yellow-magenta (CYM). The color table defines equal-spaced color points in a three-dimensional color space formed by axes of the three primary colors. For instance, a color point that has a positive red colorant quantity along the red axis and negligible blue and green colorants along the respective blue and green axes will print as a predominately red dot. Increasing the blue colorant causes movement within the color space to another color point that will print as a mixture of red and blue, such as a violet dot.

The workstation 22 has a processor 32, a volatile memory 34 (i.e., RAM), and a non-volatile memory 36 (e.g., ROM, hard disk, floppy disk, CD-ROM, etc.). The workstation 22 is configured to calibrate the color table 30 in the color printer 20. More particularly, aspects of this invention enable the printer 20 to be calibrated to remove errors or noise introduced into the color process as a result of mechanical and environmental changes.

A color table calibration program 38 is stored in memory 36 and executes on processor 32. During color calibration, the color table calibration program 38 instructs the printer 20 to print multiple color samples for each color point in the color table 30. Each color sample contains a random component. In effect, the color table calibration program 38 pseudo randomly supersamples the color point to produce a series of samples for that one point and then averages the samples to reduce noise introduced by mechanical and environmental changes.

The color table calibration program 38 has a random number generator (RNG) 40 and a sample producer 42. The random number generator 40 produces a string of random numbers that are used in creating the samples. The sample producer 42 utilizes the random numbers to create multiple color samples for a corresponding target color point in the color space. It is noted that the workstation may retain its own copy of the color table 30, although this is not shown in the figures.

Figure 3:
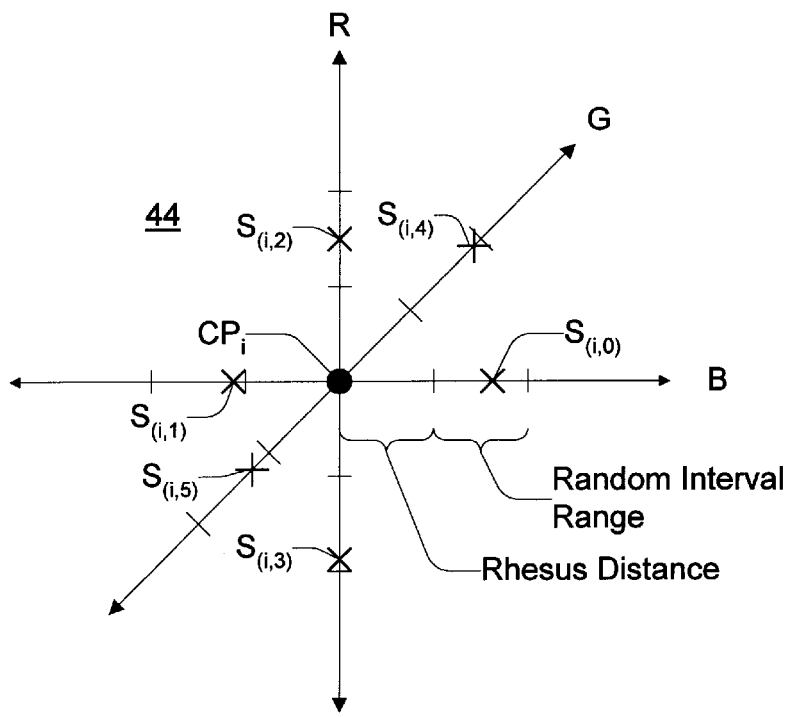
FIG. 3 is an illustration of a color space formed by colorants along three color axes.

FIG. 3 shows a target color point $CP_i$ extracted from the color table 30. The color point $CP_i$ is illustrated at the origin of three color axes: a red colorant axis R, a green colorant axis G, and a blue colorant axis B. The color axes R, G, B define a color space 44. In a preferred implementation, the sample producer 42 produces six color samples S for the target color point $CP_i$ within the color space 44. An "X" designates the six samples.

The color samples S are all offset from the target point $CP_i$ by random amounts. More particularly, each sample is offset by a distance equal to a fixed offset plus a random interval produced by the random number generator 40. The fixed offset is preferably equal to a distance that is less than the distance between two adjacent color points along an axis. This distance is referred to as the "rhesus distance". The "rhesus distance" is preferably equal to the magnitude of the noise. The random interval is preferably constrained to a range that does not exceed the rhesus distance. Accordingly, the sample offset is given as:

Sample Offset=Rhesus Distance+Random Interval, where 0<Random Interval<Rhesus Distance.

For each target color point, the sample points will typically lie between the nearest two adjacent color points in every direction along the colorant axes.

Figure 4:
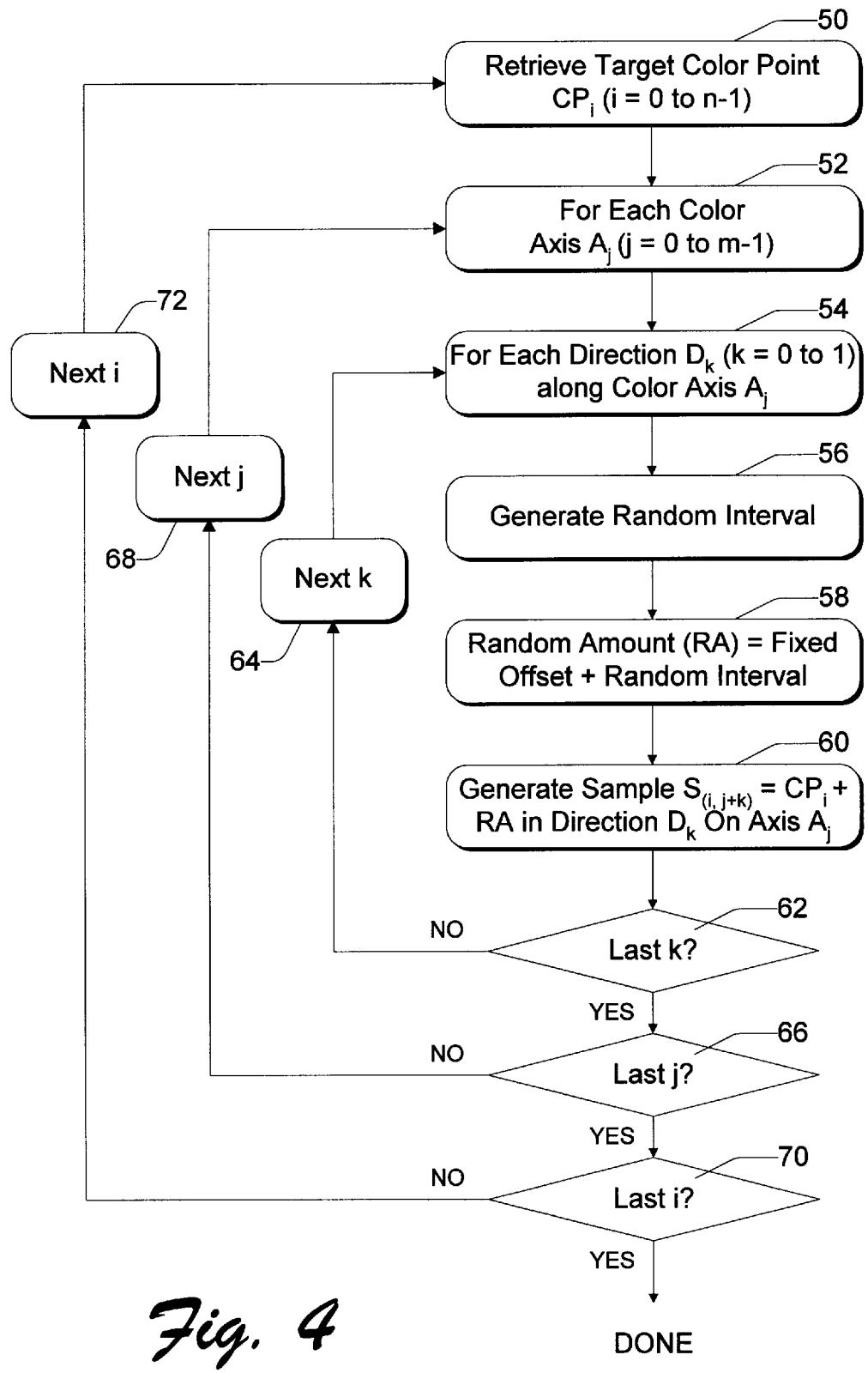
FIG. 4 is a flow diagram showing steps in a method for producing an array of color samples for each color point.

FIG. 4 shows a method for producing an array of color samples used to calibrate a color image reproduction system. At step 50, the sample producer 42 retrieves a target color point $CP_i$ from the color table 30, where I=0 to n−1 (i.e., there are "n" color points in table 30). For each colorant in color space 44, the sample producer 42 produces samples on each side of the target color point $CP_i$. This is accomplished by taking a sample in each direction $D_k$ (k=0 to 1) along each colorant axis $A_j$ (where j=0 to m−1). In our example, there are three color axes R, B, and G, resulting in six samples per target color point $CP_i$.

The computation for each sample is achieved by the two inner loops of the flow chart in FIG. 4. At step 52, the first inner loop considers each color axis $A_j$. At step 54, the innermost loop considers each direction $D_k$ along the axis $A_j$. For each direction along each axis, the random number generator 40 generates a random interval RI (step 56 in FIG. 4). The sample producer 42 adds the random interval RI to the fixed offset (i.e., the rhesus distance) to produce a random amount RA (step 58 in FIG. 4). The sample producer 42 then generates a sample $S_{(I, j+k)}$ equal to the target color point $CP_i$ plus the random amount RA (step 60 in FIG. 4).

For discussion purposes, suppose that the first axis $A_0$ (i.e., j=0) is the blue axis B (FIG. 3) and the first direction $D_0$ (i.e., k=0) is the positive direction. Steps 56–60 produce a sample $S_{(I, 0)}$ spaced a distance from target color point $CP_i$ in the positive direction along the B axis in FIG. 3. After this first iteration, the calibration program repeats the process for the second direction $D_1$ of the blue axis B (i.e., loop steps 62, 64, 54 and process steps 56–60) to produce sample $S_{(I, 1)}$. After this second iteration, the process continues for the next axis, either red or green, and for each direction along the next axis. The process continues until all six samples for a single point are taken.

Steps 62–72 form the loops which enable the process to proceed iteratively through each color point in the table (loop I), through each axis for each color point (loop j), and through each direction along each axis for each color point (loop k). The sample production phase is completed when a set of six samples has been produced for every target color point in color table 30.

The following is an example of pseudo-code used to implement the sample production process.

```
fixed offset (FO)__rhesus distance
select target color point CP_i, I = 0 to n-1;
    for each color axis A_j, j = 0 to m-1;
        for each direction D_k (k = 0 to 1) along color axis A;
            generate random interval;
            random amount (RA)__fixed offset + random interval;
            generate sample S_(i,j+k)__CP_i + RA;
        endloop
    endloop
endloop
```

The flow chart shown in FIG. 4 and above pseudo-code is provided for example and discussion purposes. Other methods and programming styles may be used to implement this invention. For example, one possible implementation is to use an interpretive programming language, such MATLAB from The Mathworks, Inc., which supports vectorized programming.

Figure 6:
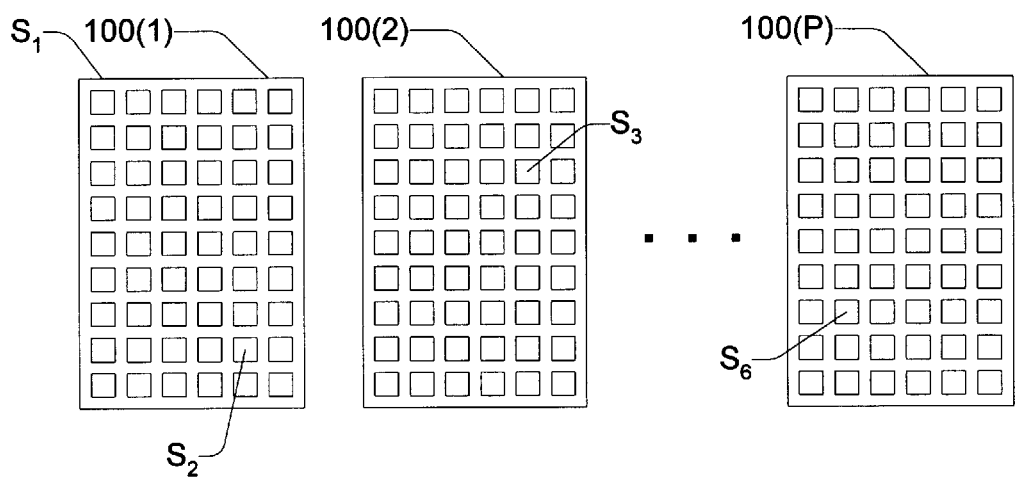
FIG. 6 is a diagrammatic illustration of multiple color samples printed on multiple sheets of media.
Figure 5:
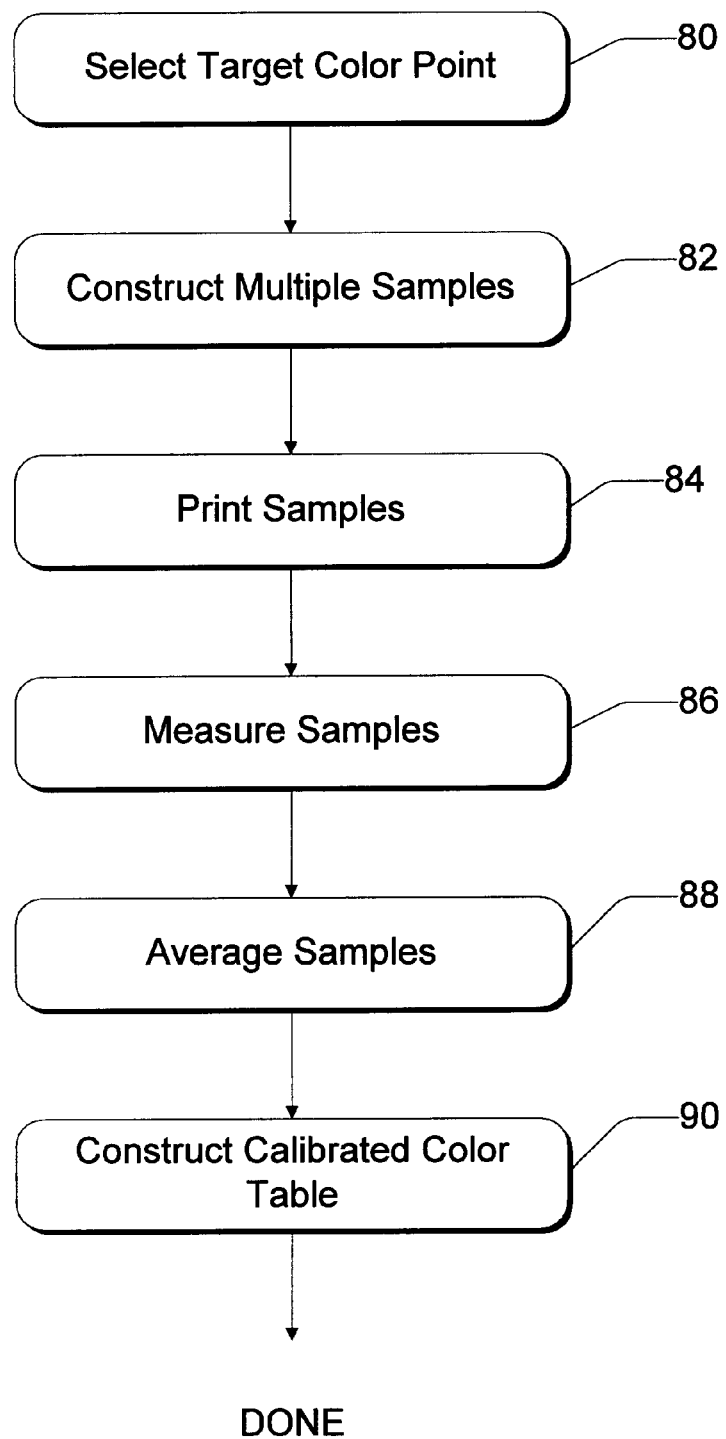
FIG. 5 is a flow diagram showing steps in a method for calibrating a color image reproduction system.

FIG. 5 shows a method for calibrating a color image reproduction system, such as color printer 20. At step 80, the color table calibration program 38 selects a target color point from the color table. The color table calibration program 38, and more particularly the sample producer 42, constructs multiple color samples for the target color point (step 82 in FIG. 5), as described above with respect to FIG. 4. At step 84 in FIG. 5, the printer 20 prints the color samples S on multiple pages 100(1), 100(2), . . . , 100(P), as shown in FIG. 6.

According to an aspect of this invention, the calibration program 38 prints the samples associated with a particular color point on different areas of a page and on different pages. FIG. 6 shows a set of samples $S_1$, $S_2$, $S_3$, and $S_6$ for a particular target color point (samples $S_4$ and $S_5$ are not shown). Samples $S_1$ and $S_2$ are printed on page 100(1); sample $S_3$ is printed on page 100(2); and sample $S_6$ is printed on page 100(P). All of the samples $S_1$, $S_2$, $S_3$, and $S_6$ are printed on different areas of the pages. Printing the samples on different page areas and different pages introduces an element of randomness to help remove any affect that might be caused by inconsistent media quality from one page to the next.

At step 86 in FIG. 5, the samples are measured using some conventional device, such as a densitometer, a colorimeter, or a spectrophotometer. At step 88, the measured samples are averaged, either by the measurement device or by the calibration program. The calibration program uses the sample average to construct a calibrated color table that may incorporate hue, saturation and lightness adjustments to allow color matching, color enhancement, or simply consistent color reproduction (step 90 in FIG. 5).

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method for producing an array of color samples used to calibrate a color image reproduction system, comprising the following steps:

producing multiple color samples for a corresponding target color in a color space; and for each one of the color samples, varying the color of said one of the color samples from the target color by a fixed offset plus an interval that is randomly generated and is not greater than the fixed offset.

2. A method as recited in claim 1, wherein the color space comprises equally spaced color points and the varying step comprises varying the color of said one of the color samples from the target color by a fixed offset equal to a distance between two adjacent color points plus the interval.

3. A method for producing an array of color samples used to calibrate a color image reproduction system, comprising the following steps:

producing multiple color samples for a corresponding target color in a color space, wherein the color space comprises equally spaced color points; and for each one of the color samples, varying the target color by a fixed offset of a magnitude equal to a magnitude of color excursions induced by noise plus a random interval that is not greater than the fixed offset.

4. A method as recited in claim 1, wherein the producing step comprises printing the color samples on different sheets of media.

5. A computer-readable medium having computer-executable instructions for performing the steps of the method as recited in claim 1.

6. A method for calibrating a color image reproduction system, comprising the following steps:

producing multiple color samples for a corresponding target color in a color space;

for each one of the color samples, varying the color of said one of the color samples from the target color by a fixed offset plus an interval that is randomly generated and is not greater than the fixed offset;

measuring the multiple color samples; and deriving a color value for the target color based upon the measurement of the multiple color samples.

7. A method for calibrating a color image reproduction system, comprising the following steps:

producing multiple color samples for a corresponding target color in a color space;

for each one of the color samples, varying the target color by a fixed offset of a magnitude equal to a magnitude of color excursions induced by noise plus a random interval that is not greater than the fixed offset;

measuring the multiple color samples; and deriving a color value for the target color based upon the measurement of the multiple color samples.

8. A method as recited in claim 6, wherein the deriving step comprises averaging measurements of the color samples and computing the color value from the averaged measurements and the target color.

9. A computer-readable medium having computer-executable instructions for performing the steps of the method as recited in claim 6.

10. A color table calibration system for calibrating a color table for an image reproduction system, the color table defining color points in a color space, comprising:

a random interval generator to generate random intervals; and a sample producer to create multiple color samples for a corresponding target color point in a color space, each color sample being offset from the target color point in the color space by a fixed offset equal to a distance between two adjacent color points plus the random interval, the random interval being.

11. A color table calibration system for calibrating a color table for an image reproduction system, the color table defining color points in a color space, comprising:

a random interval generator to generate random intervals; and a sample producer to create multiple color samples for a corresponding target color point in a color space, each color sample being offset from the target color point in the color space by a fixed offset of a magnitude equal to a magnitude of color excursions induced by noise plus a random interval that is not greater than the fixed offset.

12. A program embodied on computer-readable medium for producing an array of color samples used to calibrate a color image reproduction system, comprising:

a code segment to extract colorant quantities from a color table that are effective to produce a target color point in a color space;

a code segment to generate random values; and a code segment to produce color samples for the target color point by offsetting at least one of the colorant quantities by a distance equal to a fixed amount and an interval that is randomly generated and does not exceed the fixed amount.

13. A program embodied on computer-readable medium for producing an array of color samples used to calibrate a color image reproduction system, comprising:

a code segment to extract colorant quantities from a color table that are effective to produce a target color point in a color space;

a code segment to generate random values; and a code segment to produce color samples for the target color point, the code segment being configured to offset from the target color point in the color space by a fixed offset of a magnitude equal to a magnitude of color excursions induced by noise plus a random interval that is not greater than the fixed offset.

* * * * *